Patented Nov. 19, 1929

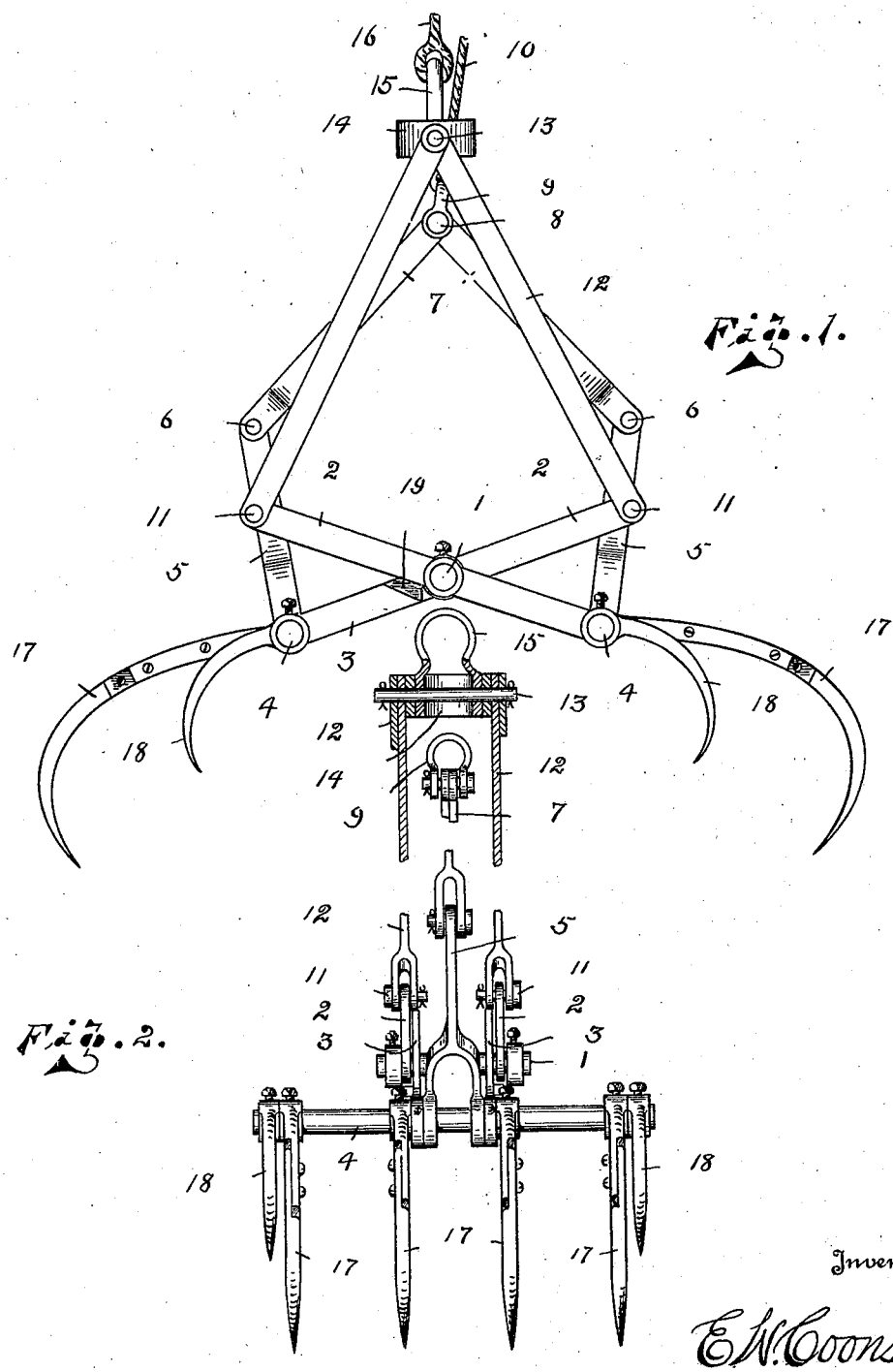

1,735,994

UNITED STATES PATENT OFFICE

EMANUEL W. COONS, OF HIBBING, MINNESOTA

GRAPPLING FORK

Application filed October 28, 1927. Serial No. 229,398.

This invention relates to grappling forks and has special reference to one particularly designed for use as an agricultural implement in the handling of hay, grain, or the like.

The principal object of the invention is to provide a more practical and efficient device of this character than heretofore known, and other objects and advantages of the novel structure will appear in the further description thereof.

Referring now to the accompanying drawing, forming part of this application, and wherein like reference characters indicate like parts:

Figure 1 is a side elevation of one of the improved grappling forks showing it in extended position ready to receive a load; while Figure 2 is a side elevation taken at right angles to Figure 1, partly in section, and the upper members of the fork being broken away.

1 represents a short supporting shaft upon which the principal operating arms of the fork are mounted, and there are four of these arms including the spaced pair 2—2 extending in one diagonal direction, and the pair 3—3 extending diagonally in the opposite direction.

Upon the free innermost ends of each pair of arms 2 and 3 is mounted a longer shaft 4, it being parallel with the shaft 1, and upon each of said latter shafts and intermediate of their respective pairs of arms 2 and 3, is mounted a forked arm or lever 5 for cooperative action in rotating the shafts, the forked portion being non-rotatably fixed to the shafts 4, and to the upper ends of which levers are pivotally attached as at 6 the bars 7, whose free ends are pivotally united as at 8 and provided with a suitable shackle 9 for attachment to the operating line 10.

To the upper end of each arm 2 and 3 is attached as at 11 an arm 12 the same being laterally disposed in respect to the forks 5 and upon one side thereof extend upwardly and connect pivotally as at 13 to the guide ring 14, while upon the opposite side the other two levers 12, identical with the last mentioned, extend upwardly and are connected to the opposite side of the guide ring 14, they being alike on both sides of said ring. The operating line 10 preferably pays through the ring, while the pivotal connection 13 to said ring comprises a through shaft upon which is mounted within the ring a suitable shackle 15 to which the operating line 16 is attached.

Upon each shaft 4 are mounted the arcuately shaped tines 17, and I prefer to use four upon each shaft equally spaced apart as shown in Figure 2 of the drawings, the same being made of telescopic sections in any desired manner so that they may be extended or restricted for varying classes of work, and to accomplish which I have shown the tines as being split substantially midway of their ends and the halves being united as by screws, or bolts; this however may be accomplished telescopically or in some other manner if desired.

Just outboard of each outermost tine 17 is mounted a small or minor tine 18 and of shorter radius than the others, they being provided to act as guards against bundles of hay or the like falling from the fork after once being grappled by same, and, as is obvious may or may not be used as desired.

As a means for preventing the fork from assuming an abnormal open position I have provided a stop 19 upon the outside of each of the arms 3 so that when the fork is fully opened the outwardly disposed arms 2 will engage said stop as clearly shown in Figure 1, and the fork thus prevented from opening too far.

The operation of the fork is as follows:

It being suspended by the two lines 10 and 16 may be raised, lowered, opened or closed, but in ordinary practice it would be lowered by maintaining stress upon the line 10 which draws the upper ends of the forked levers 5 inwardly, thus rotating the shafts 4 in such a manner as to fully extend the tines as shown in Figure 1 of the drawings, and by slacking the line 16 the lazy tong lever or arms 2 and 3 assume the position with their outer ends close together which provides full extension of the tines. When the fork is thus lowered upon a bundle of hay or the like and it is desired to raise same filled with the material, stress is put upon the line 16 and the fork lifted thereby which as is obvious will first tend to draw the shafts 4 together simultaneously with the freeing of the upper ends of the forked levers 5 which will allow the tines to forcibly grasp their load, when it may be conveyed to any desired point.

Having thus described my invention, what I claim and desire to secure by Letters Patent, is:

1. A fork of the type described comprising two major shafts carrying spaced adjustable tines thereupon, cooperative means mounted centrally upon each shaft for rotating same, supporting levers upon either side of the cooperative means and adjacent thereto, said levers including a relatively short shaft intermediate of the tine supporting shafts.

2. A fork of the type described comprising two major shafts carrying longitudinally adjustable thereupon spaced tines, cooperative means for rotating the shafts mounted centrally upon each, a relatively short shaft intermediate of the tine carrying shafts, two pairs of spaced levers mounted upon the shorter shaft and carrying the tine shafts in the lowermost ends thereof, means for operating the upper ends of said tine carrying levers, and separate means for operating the cooperative shaft rotating means.

3. A fork of the type described comprising two spaced lazy tong lever assemblies mounted upon a central shaft and rotatably supporting tine carrying shafts in the extreme ends thereof, a guide ring intermediate of and to which the upper ends of the lazy tong assemblies are pivotally attached, an operating line fixed adjacent said guide ring for controlling the action of the lazy tong, cooperative means intermediate of the lazy tong assemblies for rotating the tine carrying shafts, and a line attached to the upper end of said cooperative means passing through the guide ring.

In testimony whereof I affix my signature.

EMANUEL W. COONS.